United States Patent [19]

Kueny

[11] Patent Number: 4,524,942

[45] Date of Patent: Jun. 25, 1985

[54] OUTBOARD MOTOR MOUNTING ASSEMBLY

[75] Inventor: Don F. Kueny, Waukegan, Ill.

[73] Assignee: Outboard Marine Corporation, Waukegan, Ill.

[21] Appl. No.: 545,823

[22] Filed: Oct. 27, 1983

[51] Int. Cl.[3] .................................... F16M 1/00

[52] U.S. Cl. .................................... 248/643; 248/231.7

[58] Field of Search .................... 248/642, 643, 231.7; 411/345, 340, 346; 440/52

[56] References Cited

U.S. PATENT DOCUMENTS

| | | | |
|---|---|---|---|
| 1,077,006 | 10/1913 | Smith | 411/345 |
| 2,318,548 | 5/1943 | Whitehead et al. | 411/345 |
| 2,379,256 | 6/1945 | Schleisner | 248/642 |
| 2,527,904 | 10/1950 | Baldwin | 248/643 |
| 2,537,651 | 1/1951 | Carpenter | 248/643 |
| 2,592,772 | 4/1952 | Wardius | 248/642 X |
| 2,592,925 | 4/1952 | Mabee | 248/25 |
| 2,704,933 | 3/1955 | McMullan | 248/642 X |
| 2,785,563 | 3/1957 | Strollis | 248/643 X |
| 2,798,369 | 7/1957 | Homan | 248/643 X |
| 2,858,690 | 11/1958 | Sanderson et al. . | |
| 2,966,876 | 1/1961 | MacWilliams | 248/642 X |
| 3,003,725 | 10/1961 | Woolbright | 248/643 |
| 3,025,028 | 3/1962 | Corbin et al. | 248/643 |
| 3,106,375 | 10/1963 | Donaldson | 248/643 |
| 3,598,348 | 8/1971 | Kiekhaefer | 248/642 |
| 3,943,877 | 3/1976 | Kemp | 248/643 |
| 4,052,952 | 10/1977 | Hale et al. | 440/52 |

FOREIGN PATENT DOCUMENTS

| | | | |
|---|---|---|---|
| 436613 | 4/1912 | France | 411/345 |

*Primary Examiner*—J. Franklin Foss
*Attorney, Agent, or Firm*—Michael, Best & Friedrich

[57] ABSTRACT

An assembly for mounting an outboard motor on the transom of a boat, the assembly comprising an inverted U-shaped clamp member adapted to have the motor mounted thereon, the clamp member including an upper body portion, an inside leg extending downwardly from the upper body portion and in position to be located inside of the transom, the inside leg being rigidly connected to the upper body portion, and an outside leg extending downwardly from the upper body portion and in position to be located outside of the transom, the outside leg being rigidly connected to the upper body portion, a transom plate adapted to be mounted on the inside of the transom, and means adapted to extend through the transom for securing the outside leg to the transom plate.

6 Claims, 3 Drawing Figures

OUTBOARD MOTOR MOUNTING ASSEMBLY

BACKGROUND OF THE INVENTION

This invention relates to mounting assemblies for outboard motors, and more particularly to mounting assemblies for intermediate size motors, generally in the 35 through 75 HP range.

With motors of this size, it is necessary to provide attachment to the boat which is firm and will not loosen during operation, but it is desirable to allow installation and removal without tools.

Outboard motors have historically been attached to a boat with hand operated clamp screws. As motors became more powerful, various means of bolting the engine to the transom came into use.

Known systems that do not require tools for installation and removal do not provide the desired firm attachment. The common weakness has been for the motor to gradually work its way upward during high speed operation, until the clamp screws clear the transom and the motor is lost. A transom plate with a retaining lip has been used, but it becomes ineffective when the clamp screws loosen from vibration.

Attention is directed to the following U.S. patents which disclose mounting assemblies for outboard motors.

| Patentee | U.S. Pat. No. | Issued |
|---|---|---|
| Hale | 4,052,952 | October 11, 1977 |
| Kemp | 3,943,877 | March 16, 1976 |
| Keikhaefer | 3,598,348 | August 10, 1971 |
| Donaldson | 3,106,375 | October 8, 1963 |
| Corbin | 3,025,028 | March 13, 1962 |
| Woolbright | 3,003,725 | October 10, 1961 |
| Sanderson | 2,858,690 | November 4, 1958 |
| Homan | 2,798,369 | July 9, 1957 |
| Strollis | 2,785,563 | March 19, 1957 |
| McMullan | 2,704,933 | March 29, 1955 |
| Mabee | 2,592,925 | April 15, 1952 |
| Carpenter | 2,537,651 | January 9, 1951 |
| Baldwin | 2,527,904 | October 31, 1950 |
| Schleisner | 2,379,256 | June 26, 1945 |

SUMMARY OF THE INVENTION

This invention provides an assembly for mounting an outboard motor on the transom of a boat. The assembly includes an inverted U-shaped clamp member adapted to have the motor mounted thereon, the clamp member including an upper body portion, an inside leg extending downwardly from the upper body portion and in position to be located inside of the transom, and an outside leg extending downwardly from the upper body portion and in position to be located outside of the transom, with both the inside leg and the outside leg being rigidly connected to the upper body portion. The assembly further includes a transom plate adapted to be mounted on the inside of the transom, and means adapted to extend through the transom for securing the outside leg to the transom plate.

In one embodiment, the assembly further includes means for clamping the clamp member to the transom, and the clamping means and the transom plate include selectively engageable interengaging means for fixing the clamping means to the transom plate.

In one embodiment, the assembly further includes a recessed area on the transom plate and a screw clamp on the inside leg, with the end of the screw clamp being engageable in the recessed area.

In one embodiment, the transom includes an opening, and the securing means includes a bore through the transom plate and a bore through the outside leg, the bores being in position to be aligned with the opening in the transom, and a slide-through pin including a shaft receivable in the bores, the shaft including a first end and a second end, the first end having a projection which prevents the shaft from passing through the bores, and the second end including a pivotably mounted cam piece having a narrow dimension which passes through the bores, and a wide dimension which does not pass through the bores.

In one embodiment, wherein the outside leg has a bottom end, and the assembly further includes means for preventing movement of the bottom end of the outside leg relative to the transom. The movement preventing means includes a slot in the bottom end of the outside leg and a member adapted to be attached to the transom and receivable in the slot, the member having a lip which overlaps the bottom end of the outside leg.

One of the principal features of the invention is to provide an assembly for mounting an outboard motor on the transom of a boat, with the assembly providing attachment to the boat which is firm and will not loosen during operation, while allowing installation and removal without tools.

Other features and advantages of the invention will become apparent to those skilled in the art upon reviewing the following detailed description, the drawings, and the appended claims.

DESCRIPTION OF THE PREFERRED EMBODIMENT

Figure 1:
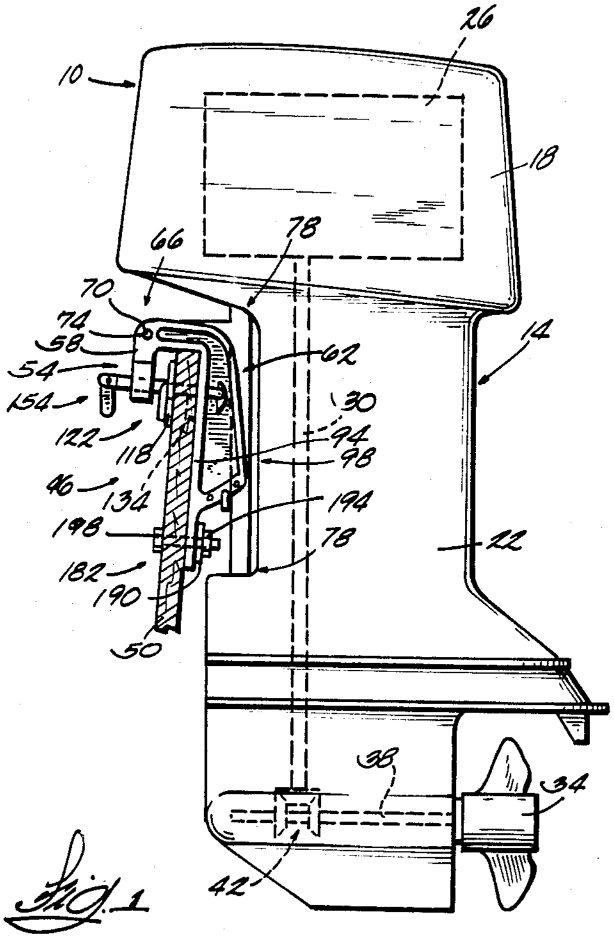
FIG. 1 is a side view of an outboard motor attached to the transom of a boat by the mounting assembly of the invention.

Shown in FIG. 1 of the drawings is an outboard motor 10 having a generally conventional propulsion unit 14 including a powerhead 18 and a lower unit 22. The powerhead 18 houses the engine 26 which drives the drive shaft 30. The lower unit 22 includes, at the lower end thereof, the propeller 34 which is mounted on the propeller shaft 38. The drive shaft 30 extends downwardly through the lower unit 22 and engages the reversing transmission 42, thereby driving the propeller shaft 38.

Also shown in FIG. 1 is means 46 for pivotally mounting the outboard motor 10 for pivotal movement in both the horizontal and vertical planes relative to a transom 50 of a boat, whereby to provide for steering movement of the propulsion unit 14 in the horizontal plane, and to provide for movement in the vertical plane between a lowermost position with the propeller 34 fully submerged in water for driving propulsion and a raised position affording above-water access to the propeller 34.

The means 46 for pivotally mounting the outboard motor 10 includes a mounting assembly 54 which includes a transom bracket 58 adapted to be fixedly mounted on the transom 50 of the boat.

The outboard motor 10 further includes a swivel bracket 62, and the means 46 for pivotally mounting the outboard motor 10 further includes means 66 for pivotally connecting the swivel bracket 62 to the transom bracket 58 for pivotal movement of the swivel bracket 62 relative to the transom bracket 58 about a pivot axis 70. Any means for effecting such pivotal connection can be employed, although in this embodiment such means is a tilt pin 74.

The outboard motor 10 further includes means 78 for pivotally connecting the propulsion unit 14 to the swivel bracket 62 for movement in common with the swivel bracket 62 relative to the transom bracket 58 about the pivot axis 70 and for steering movement of the propulsion unit 14 about a generally vertical axis relative to the swivel bracket 62. Any suitable means can be provided for pivotally connecting the swivel bracket 62 and the propulsion unit 14 and any suitable means can be employed for effecting steering of the propulsion unit 14.

Figure 3:
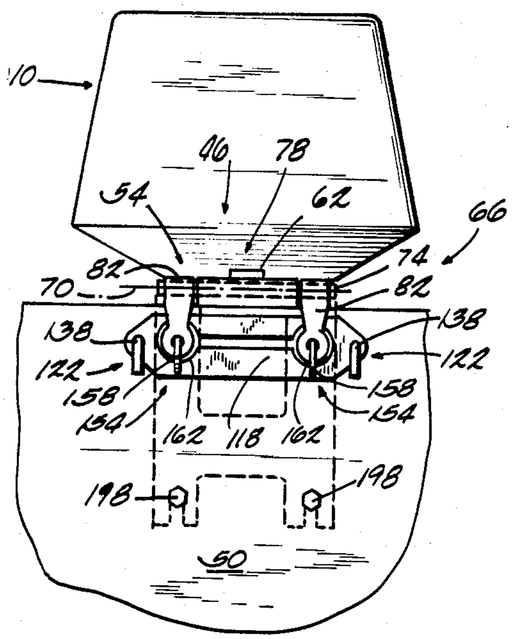
FIG. 3 is a front view of the outboard motor and the mounting assembly.
Figure 2:
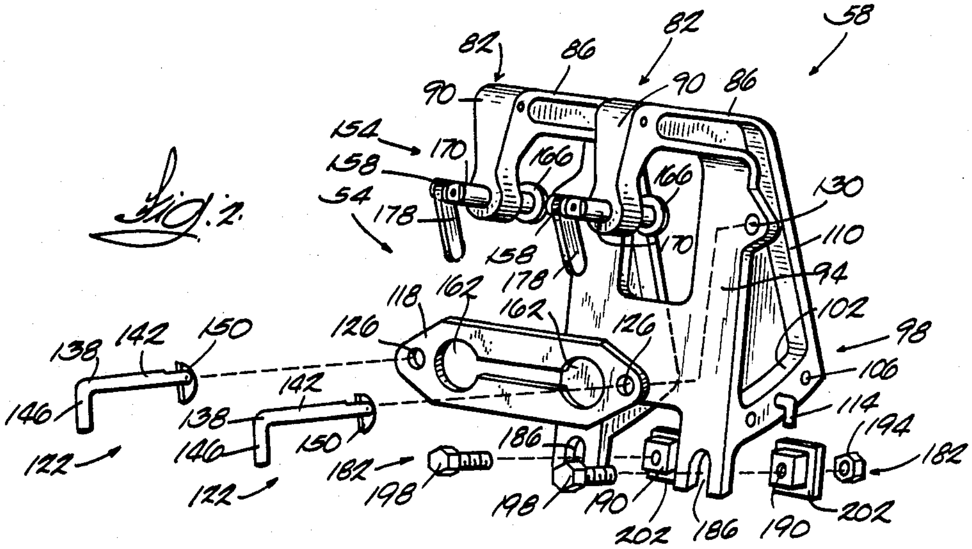
FIG. 2 is an enlarged perspective view of the mounting assembly shown in FIG. 1.

As shown in FIG. 2, the transom bracket 58 includes two inverted U-shaped clamp members 82 adapted to be fixedly mounted on the transom 50 of the boat. The transom bracket 58 can be of unitary construction, as shown in phantom in FIGS. 2 and 3, or can comprise several parts. While this embodiment includes two inverted U-shaped clamp members 82, an alternative embodiment could include one clamp member 82, or any other number thereof.

Referring to FIG. 2, each clamp member 82 comprises an upper body portion 86, an inside leg 90 extending downwardly from the upper body portion 86 and in position to be located inside of the transom 50, the inside leg 90 being rigidly connected to the upper body portion 86, and an outside leg 94 extending downwardly from the upper body portion 86 and in position to be located outside of the transom 50, the outside leg 94 being rigidly connected to the upper body portion 86. In this embodiment, the upper body portion 86, inside leg 90, and outside leg 94 are integrally joined to form the U-shaped clamp member 82.

Included in this embodiment of the transom bracket 58 is means 98 for maintaining proper trim of the propulsion unit 14. It is to be understood that this trim means 98 is not a necessary part of the invention, and alternative embodiments could exclude it. In this embodiment the trim means 98 includes an arm 102, with spaced holes 106 therein, extending rearwardly at an upward angle from the outside leg 94 on each clamp member 82. The end of the arm 102 is connected to the upper body portion 86 by a connecting member 110. A pin 114 is inserted through the proper hole 106 to maintain proper trim of the outboard motor 10.

Referring to FIG. 2, the mounting assembly 54 further includes a transom plate 118 adapted to be mounted on the inside of the transom 50, and means 122 adapted to extend through the transom 50 for securing each outside leg 94 to the transom plate 118. While various suitable means can be used for this purpose, in the specified construction illustrated, the securing means 122 for each outside leg 94 includes a bore 126 through the transom plate 118 and a bore 130 through the outside leg 94, the bores 126 and 130 being in position to be aligned with an opening 134 (see FIG. 1) in the transom 50. The securing means 122 further includes a slide-through pin 138 receivable in the bore 126 in the transom plate 118, the opening 134 in the transom 50, and the bore 130 in the outside leg 94. The slide-through pin 138 is similar to the existing engine thrust pins, comprising a shaft 142, a projection 146 on one end of the shaft 142 which prevents the pin from passing through the bore 126 in the transom plate 118, and a pivotal cam piece 150 on the other end of the shaft 142. The cam piece 150 has a narrow dimension which will pass through the bores 126 and 130, and a wide dimension which will not pass through the bores 126 and 130.

In the embodiment illustrated in FIG. 2, the mounting assembly 54 provides means 154 for clamping each clamp member 82 to the transom 50. While various means could be employed, in the specified construction illustrated, the clamping means 154 includes a screw clamp 158 on each inside leg 90 and a pair of recessed areas 162 in the transom plate 118, with each recessed area 162 being engageable by the head 166 of one of the screw clamps 158.

This recessed area 162 could be either an indentation in the surface of the transom plate 118 or an opening extending through the transom plate 118. The important feature of either construction is the upper edge of the recess 162 which is engageable by the upper edge of the head 166 of the screw clamp 158, thereby preventing the head 166 of the screw clamp 158 from sliding upward along the transom 50.

Each screw clamp 158 further comprises a threaded shaft 170 engaged in a threaded bore 174 through the inside leg 90, and a hand grip 178 for turning the screw clamp 158.

In another alternative embodiment, means 182 are also provided for preventing the bottom ends of the outside legs 94 from moving relative to the transom 50, although in other embodiments these means 182 might be omitted. While various suitable means can be used for this purpose, in the specified construction the movement preventing means 182 for each outside leg 94 comprises a slot 186 in the bottom end of the outside leg 94, and a member 190 adapted to be attached to the transom 50 and received in the slot 186. The member 190 is attached to the transom 50 by a nut 194 and a bolt 198, the member 190 having a lip 202 which overlaps and clamps the bottom end of the outside leg 94 to the transom 50.

Various of the features of the invention are set forth in the following claims.

I claim:

1. An assembly for mounting an outboard motor on the transom of a boat, said assembly comprising an inverted U-shaped clamp member adapted to have the motor mounted thereon, said clamp member including an upper body portion, an inside leg extending downwardly and rigidly from said upper body portion and in position to be located inside of the transom, an outside leg extending downwardly and rigidly from said upper body portion and in position to be located outside of the transom and including a bottom end, a transom plate adapted to be fixed on the inside of the transom, and means adapted to extend through the transom for securing said outside leg to said transom plate, means for clamping said clamp member to the transom including selectively engageable interengaging means on said clamping means and said transom plate for fixing said clamping means to said transom plate, and means for preventing movement of said bottom end relative to the transom.

2. An assembly in accordance with claim 1 and further including a recessed area on one of said transom plate and said inside leg, and a screw clamp on the other of said transom plate and said inside leg, said screw clamp including an end engageable in said recessed area.

3. An assembly in accordance with claim 2 wherein the transom includes an opening and wherein said securing means comprises a bore through said transom plate, a bore through said outside leg, said bores being in position to be aligned with the opening in the transom, and a slide-through pin including a shaft receivable in said bores, said shaft including a first end and a second end, said first end having a projection which prevents said shaft from passing through said bores, and said second end including means for selectively permitting and not permitting said shaft from passing through said bores.

4. An assembly in accordance with claim 3 wherein said selective means includes a cam piece pivotably mounted on said second end and having a narrow dimension which passes through said bores, and a wide dimension which does not pass through said bores.

5. An assembly for mounting an outboard motor on the transom of a boat, said assembly comprising an inverted U-shaped clamp member adapted to have the motor mounted thereon, said clamp member including an upper body portion, an inside leg extending downwardly from said upper body portion and in position to be located inside of the transom, said inside leg being rigidly connected to said upper body portion, an outside leg extending downwardly from said upper body portion and in position to be located outside of the transom and including a bottom end, said outside leg being rigidly connected to said upper body portion, a transom plate adapted to be mounted on the inside of the transom, means adapted to extend through the transom for securing said outside leg to said transom plate, means for preventing movement of said bottom end relative to the transom comprising a slot in said bottom end of said outside leg, and a member adapted to be attached to the transom and receivable in said slot, said member having a lip which overlaps said bottom end, and means for clamping said clamp member to the transom including selectively engageable interengaging means on said clamping means and said transom plate for fixing said clamping means to said transom plate.

6. An assembly for mounting an outboard motor on the transom of a boat wherein the transom includes an opening, said assembly comprising an inverted U-shaped clamp memember adapted to have the motor mounted thereon, said clamp member including an upper body portion, an inside leg extending downwardly from said upper body portion and in position to be located inside of the transom, said inside leg being rigidly connected to said upper body portion, and an outside leg extending downwardly from said upper body portion and in position to be located outside of the transom, said outside leg including a bottom end and being rigidly connected to said upper body portion, a transom plate adapted to be mounted on the inside of the transom, a recessed area in said transom plate, a screw clamp on said inside leg, said screw clamp including an end engagable in said recessed area, a bore through said transom plate and a bore through said outside leg, said bores being in position to be aligned with the opening in the transom, a slide-through pin comprising a shaft receivable in said bores, said shaft including a first end and a second end, said first end having a projection which prevents said shaft from passing through said bores, and said second end including a cam piece pivotally mounted on said second end and having a narrow dimension which will pass through said bores, and a wide dimension which will not pass through said bores, a slot in said bottom end of said outside leg, and a member adapted to be attached to the transom and receivable in said slot, said member having a lip which overlaps said bottom end.

* * * * *